Jan. 9, 1962    M. KAHN ETAL    3,016,071
LIGHT POLARIZING FABRICS
Filed Aug. 26, 1958

MYRON KAHN
ALVIN M. MARKS
MORTIMER M. MARKS
INVENTORS

BY Albert F. Kronman

ATTORNEY

United States Patent Office 3,016,071
Patented Jan. 9, 1962

3,016,071
LIGHT POLARIZING FABRICS
Myron Kahn, 1101 162nd St., Alvin M. Marks, 149—61 Powells Cove Blvd., and Mortimer M. Marks, 166—25 Cryders Lane, all of Whitestone 57, N.Y.
Filed Aug. 26, 1958, Ser. No. 757,351
3 Claims. (Cl. 139—420)

This invention relates to fabrics and more specifically to fabrics having the property of polarizing light transmitted therethrough.

It has long been known that polarized light improves visibility by eliminating glare. Sunglasses and illuminating sources have been made for this purpose. Where large amounts of light enter a building through a window, it is customary to control the light by means of shades, drapes and the like.

Accordingly, it is an object of the present invention to supply light polarizing materials for use in connection with drapery fabrics and the like.

Another object of the present invention is to provide decorative fabrics employing the principles of polarized light.

Another object of the present invention is to control the amount of light entering a room by the use of light polarizing fabrics.

Another object of the present invention is to prolong the life of light polarizing materials by screening out ultraviolet light which may strike the said materials.

A feature of the present invention is its use of one or more strands of light polarizing fibers in the weaving of fabrics.

Another feature of the present invention is its use of birefringent fibers or strands in combination with nonpolarizing strands in the manufacture of a fabric.

A further feature of the present invention is its use of the principles of light polarization and the color effects produced by birefringent materials between light polarizers to produce highly decorative materials.

A feature of the present invention is the incorporation of ultra-violet absorbing films in light polarizing fabrics to extend the useful life thereof.

The invention consists of the construction, combination and arrangement of parts, as herein illustrated, described and claimed.

In the accompanying drawings, forming a part hereof is illustrated four forms of embodiment of the invention and in which.

Figure 1:
FIG. 1 is a fragmentary view in side elevation, greatly enlarged, of a fiber having light polarizing properties.

Referring to the drawings and specifically to FIG. 1, there is shown a strand of a fiber 10 such as ramie, or a stretched synthetic linear polymer, such as polyvinyl alcohol, butyral, cellulose acetate or cellulose butyrate, stretched polyesters such as Mylar, and the like.

These materials may be dyed with either an iodine zinc chloride reagent or direct cotton dye stuffs comprising dichroic dyes to make them efficient light polarizers. Polyvinyl alochol or butyral may be stretched, impregnated with iodine or other known polarizing substances and then stabilized with boron or silicon compounds in the manner well known in the art.

For the purpose of the present description, the light polarizing fibers have been illustrated with a plurality of dashed lines to indicate their peculiar light controlling properties. The fibers which are not polarizing may comprise isotropic or stretched materials such as fiberglass, unstretched cellulose acetate, and the like.

Figure 2:
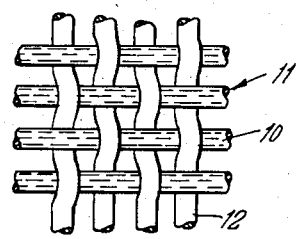
FIG. 2 is a fragmentary view, greatly enlarged, of a fabric woven from strands of light polarizing and isotropic or other suitable materials.

In FIG. 2 there is illustrated, on a very much enlarged scale, a fragment of a fabric 11 in which strands of light polarizing fibers 10 are interwoven with non-polarizing fibers 12. In the embodiment shown in FIG. 2, all of the parallel horizontal strands are similar to the fiber shown in FIG. 1 and have the property of polarizing light transmitted therethrough. All of the vertical strands are non-polarizing fibers, such as are hereinabove disclosed. It will be understood that all the fabrics will be tightly woven to exclude uncontrolled incident light and that the showing of FIGS. 2, 3, 4 and 5 is merely for the purpose of clarifying the description.

A second fabric may be woven in which all of the longitudinal or vertical strands are light polarizing and the horizontal or transverse strands are isotropic. When the two fabrics are placed one upon the other, light incident upon the first fabric will be plane polarized in one direction and subsequently absorbed as it traverses the second fabric having its plane of polarization at 90° to that of the first fabric.

In this manner, the intensity of light entering a room may be controlled. Light which traverses only one of the curtains, if allowed to enter the room, will be deprived of its glare component and thereby will improve room illumination.

Figure 3:
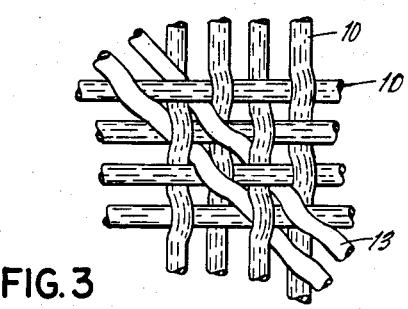
FIG. 3 is a fragmentary view greatly enlarged, of a fabric combining polarizing and non-polarizing strands of material whereby decorative effects are achieved.
Figure 4:
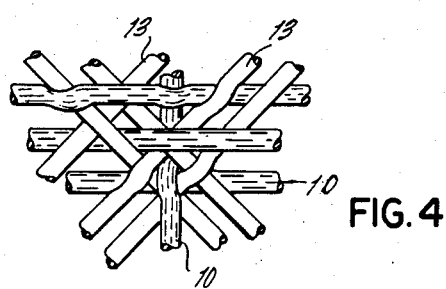
FIG. 4 is a fragmentary view similar to FIG. 3, illustrating still another decorative fabric.

When birefringent threads 13, as shown in FIG. 3, are included between threads 10 which are light polarizing and which are woven into a fabric at right angles to each other, as is the case of the embodiment shown in FIGS. 3 and 4, there is produced a variety of irridescent colors which change according to the angle of the view of the observer. Such irridescent colors are extremely pure and form highly decorative effects. A further embodiment employing this principle is shown in FIG. 4 in which the birefringent threads 13 are criss-crossed at right angles to each other and disposed between light polarizing threads 10.

Figure 5:
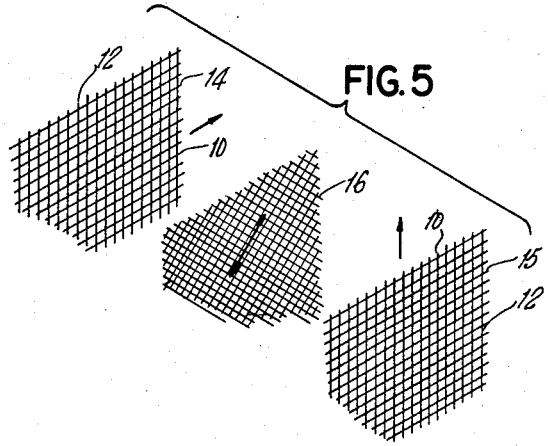
FIG. 5 is a somewhat diagrammatic exploded view of a 3-ply fabric made in accordance with the present invention.
Figure 6:
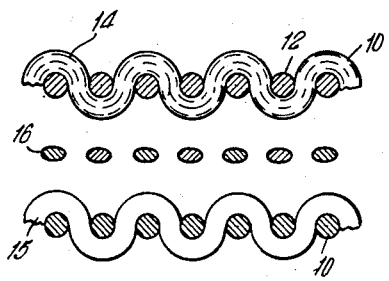
FIG. 6 is a cross sectional view, greatly enlarged, of the 3-ply fabric of FIG. 5, showing the respective disposition of the elements.

In FIG. 5 there is shown a first fabric 14 made of light polarizing strands and isotropic or transparent strands having the light polarizing fibers 10 disposed horizontally and a second fabric 15 similar to the first 14 but having its polarizing fibers vertically disposed. Interposed between the fabrics 14 and 15 is a fabric or foil of a suitable birefringent material 16 preferably having its axis disposed at 45° or 135° to the horizontal and having relative retardations between one-quarter and five wave lengths. Such a fabric will produce highly decorative irridescent effects when a light source is viewed therethrough.

When the fabrics are to be displayed or hung in sun light it may be necessary, in order to prolong the useful polarizing life of the fibers, to coat the said fibers with an ultra-violet light absorbing material. For this purpose coatings of substituted benzo-phenone or benzotriazole or a suspension of carbon with particles less than one-quarter wave length in size carried in a suitable vehicle may be used.

From the foregoing it will be seen that there has been provided a fabric for controlling light incident thereon which will reduce glare and provide decorative effects when disposed in front of a light source.

It is within the purview of the present invention to employ fibers having round or flattened cross sectional shapes. Where flattened fibers having a somewhat ribbon-like configuration are used, a broader area of polarization can be presented to the light incident upon the fabric.

The birefringent material shown in FIG. 5, in addition to being interposed between the light polarizing fabrics, may be attached to one of them or may be laminated in a sandwich between them. In addition, the birefringent material may consist of flocked fibers, flakes or sheets secured to one or both of said woven polarizers in decorative patterns.

Having thus fully described the invention, what is claimed as new and desired to be secured by Letters Patent of the United States, is:

1. A fabric having the property of polarizing light passing therethrough comprising, a foil of tightly woven longitudinal and transverse strands disposed at right angles to each other at least a portion of which strands consists of a plurality of parallel fibers of a light polarizing material, and a plurality of birefringent elements angularly disposed with respect to said light polarizing strands and positioned therebetween.

2. A fabric having the property of controlling light incident thereon comprising, a foil of tightly woven longitudinal and transverse strands of light polarizing fibers, said longitudinal and transverse fibers being disposed at right angles to each other, and a plurality of birefringent elements disposed between said polarizing strands.

3. A light polarizing material for use in connection with drapery fabrics and the like comprising a first fabric at least a portion of which consists of light polarizing fibers, a second fabric at least a portion of which consists of light polarizing fibers disposed at an angle to said first fabric fibers, and a fabric of birefringent elements interposed between said first and second fabrics.

References Cited in the file of this patent

UNITED STATES PATENTS

| | | |
|---|---|---|
| 2,018,214 | Land | Oct. 22, 1935 |
| 2,146,962 | Land | Feb. 14, 1939 |
| 2,617,329 | Dreyer | Nov. 11, 1952 |
| 2,687,673 | Boone | Aug. 31, 1954 |
| 2,699,706 | Boone | Jan. 18, 1955 |